Sept. 15, 1953　　J. C. TRAVILLA, JR., ET AL　　2,652,001
RAILWAY TRUCK
Filed Aug. 7, 1946　　　　　　　　　　　　　　2 Sheets-Sheet 1
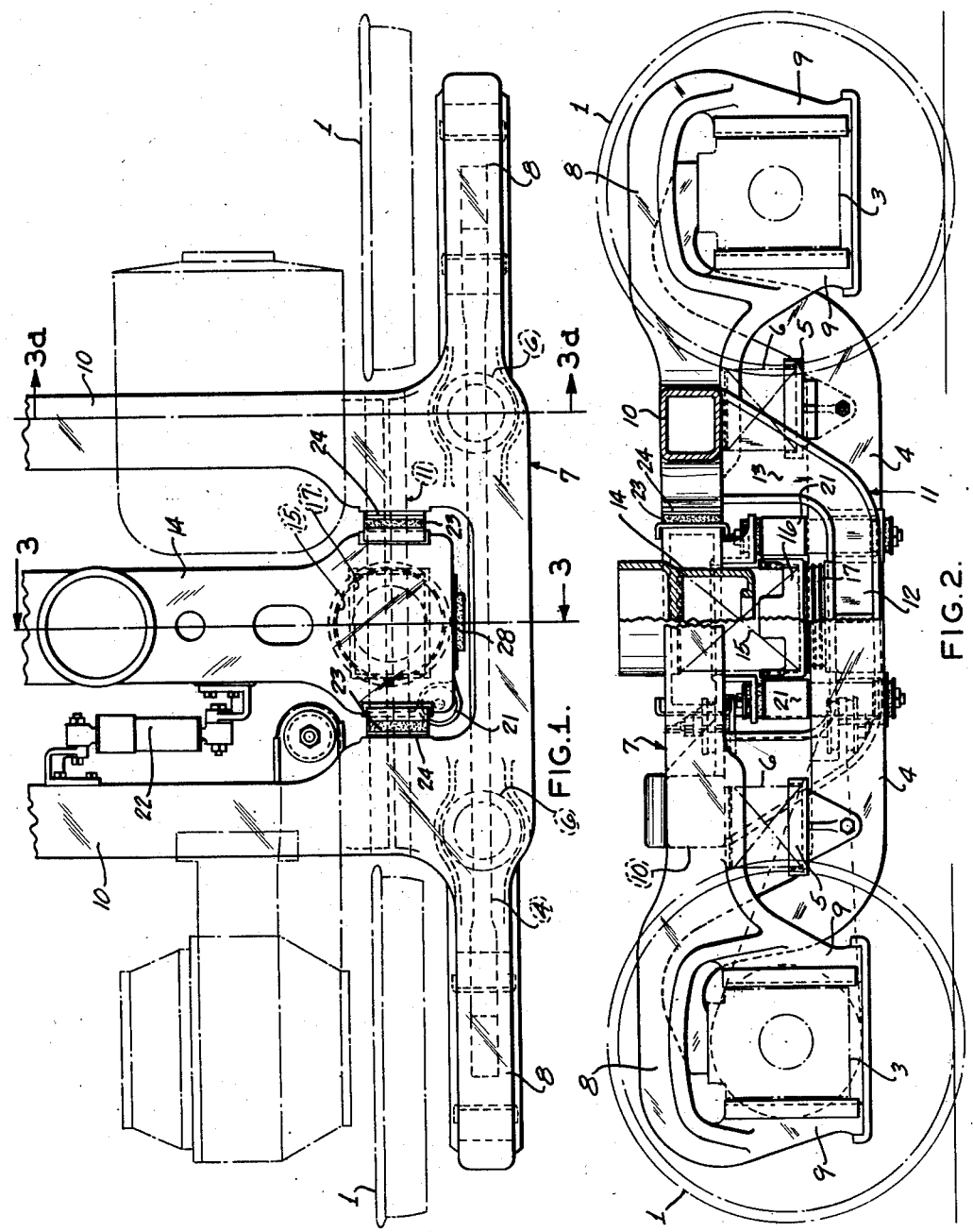
INVENTORS
JAMES C. TRAVILLA, JR.
WILLIAM M. SHEEHAN
By Rodney Bedell
ATTORNEY

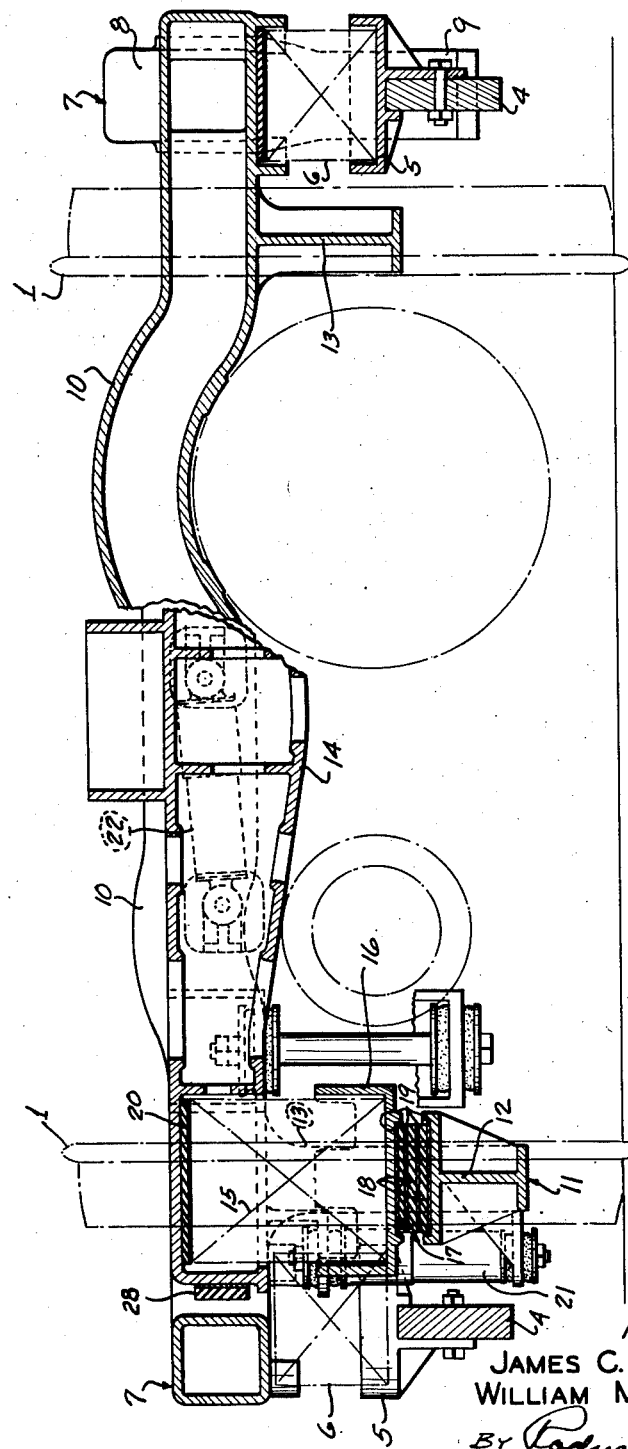

Patented Sept. 15, 1953

2,652,001

UNITED STATES PATENT OFFICE 2,652,001

RAILWAY TRUCK

James C. Travilla, Jr., Swarthmore, and William M. Sheehan, Philadelphia, Pa., assignors to General Steel Castings Corporation, Granite City, Ill., a corporation of Delaware Application August 7, 1946, Serial No. 689,032

5 Claims. (Cl. 105—193)

The invention relates to railway rolling stock and more particularly to railway trucks of the type in which the load supporting bolster is carried by springs mounted on the truck frame without the use of a spring plank and swing hangers, the spring support arrangement being such that the bolster has movement laterally of the truck relative to the truck frame to accommodate track irregularities, alternate tangent and curved track, and other conditions tending to create side thrusts between the vehicle body and truck.

The main object of the invention is to provide a simplified, smooth riding truck which absorbs small lateral shocks completely and controls, cushions, and damps shocks of larger magnitude without undesirable lateral movement of the car body or application of undesirable shocks thereto. Another object is to absorb and cushion longitudinal forces between the truck frame and bolster. These objects are accomplished by using a resilient means, such as rubber or rubber-like material, between the bottom of each bolster supporting spring and the truck frame, and by using shock absorbers to dampen the vertical and lateral movements of the bolster relative to the frame.

These and other detail objects as will appear below are attained by the structure illustrated in the accompanying drawings, in which:

Figure 1 is a top view of a longitudinal half of a four-wheel railway truck constructed according to the invention.

Figure 2 is in part a side view and in part a vertical section on the longitudinal center line of the truck.

Figure 3 is a transverse vertical section, drawn to enlarged scale the left hand side being taken approximately on line 3—3 and the right hand side being taken approximately on line 3a—3a of Figure 1.

The truck includes the usual wheel and axle assemblies 1 and journal boxes 3. Equalizers 4 extend between the journal boxes at each side of the truck and are provided with spaced seats 5 for springs 6 yieldingly supporting a truck frame 7 which includes wheel pieces 8 and widely spaced transverse transoms 10. Pedestal legs 9 depend from wheel pieces 8 and receive journal boxes 3 between them.

A downwardly extending U-shaped member 11, including a substantially horizontal portion 12 and substantially vertical portions 13, is formed integral with truck frame 7 and extends alongside each equalizer 4 and inwardly thereof, at each side of the truck, from one transom to the other. A bolster 14 extends transversely of the truck and is supported at its ends by coil springs 15 mounted in seats 16 carried by horizontal portions 12 of members 11. Mounted on horizontal portions 12 and supporting spring seats 16 are yielding pads 17, formed of alternate layers of rubber 18 and steel 19 bonded together. Retaining lugs extend upwardly and downwardly respectively from the top of portion 12 and from the bottom of spring seat 16 alongside the lower and upper edges of the pads. The pads are sufficiently thick to space the associated lugs vertically from each other, and the sides of the pads between the lugs may yield in shear to lateral forces applied in opposite directions to the bolster and frame. A flat rubber insulating strip 20 is positioned between the top of each coil spring 15 and bolster 14. Vertical shock absorbers 21 are positioned at diagonally opposite corners of bolster 14 and are secured to the bolster and the U-shaped members 11 to damp vertical movement of the bolster relative to the truck frame. A horizontally positioned shock absorber 22 extends transversely of the truck and is secured to bolster 14 and one of the transoms to damp lateral movement of the bolster relative to the truck frame.

Rubber cushioned chafing plates 23 are provided at the sides adjacent the ends of the bolster and engage wear plates 24 on the transoms 10 and rubber stops 28 on the ends of the bolster engage truck wheel pieces 8 to limit relative movement of the bolster longitudinally and laterally of the truck frame.

A railway truck of the kind described is designed to be simple in construction, to ride smoothly, absorb small lateral shocks and control, cushion and damp lateral shocks of larger magnitude without undesirable lateral movement of the car body or application of undesirable shocks thereto. Longitudinal forces exerted on the truck also are cushioned and absorbed.

The details of the construction may be varied substantially without departing from the spirit of the invention and the exclusive use of such modifications as come within the scope of the claims is contemplated.

What is claimed is:

1. In a railway truck, wheel and axle assemblies, equalizers at each side of the truck carried by said assemblies, a rigid truck frame including wheel pieces yieldingly supported on said equalizers and including spaced transoms extending between said wheel pieces and at substantially the same level as said wheel pieces, there being a U-shaped member at each side of the truck having upright legs and a cross bar at the lower end thereof with the upper ends of its legs integral with said transoms and with its cross bar adjacent the level of and parallel with said equalizers and spaced therefrom inwardly of the truck, pads of rubber-like material mounted on the cross bars of said members, and a load carrying bolster extending transversely of the truck between said wheel pieces and transoms and at substantially the same level as said wheel pieces and transoms, bolster carrying springs supported from said pads, the sides of said pads being free to incline for the pads to yield in shear to lateral forces applied in opposite directions transversely of the truck to their upper and lower surfaces respectively to accommodate relative lateral movement of said frame and bolster, there being a shock absorber attached to each end of the bolster and to the adjacent U-shaped member to control the action of the bolster springs.

2. In a railway truck, wheel and axle assemblies, equalizers at each side of the truck carried by said assemblies, a rigid truck frame including wheel pieces yieldingly supported on said equalizers and including a member at each side of the truck forming a horizontal seat at about the same general level as the corresponding equalizer and fixedly spaced therefrom inwardly of the truck, pads of rubber-like material mounted on said seats, a load carrying bolster extending transversely of the truck with its ends supported from said pads, said pads yielding in shear to lateral forces applied in opposite directions transversely of the truck to their upper and lower surfaces respectively to accommodate relative lateral movement of said frame and bolster, transoms at the opposite sides of said bolster and spaced a substantial distance therefrom and connecting said wheel pieces, and a shock absorber at the general level of and between said bolster and at least one of said transoms to dampen the lateral movement of the bolster relative to the truck frame.

3. A truck as described in claim 2 in which the shock absorber is formed of elongated members telescopingly assembled with its axis extending transversely of the truck at the level of the bolster and transoms, and its opposite ends connected to the bolster and transom respectively.

4. In a railway truck, wheel and axle assemblies, a truck frame support from said assemblies and including side members, with pedestals spacing the assemblies, positioned above the level of the axles, and including a part rigid therewith forming a horizontal seat at a lower level than the axles, a pad of rubber-like material mounted on each of said seats, a load-carrying bolster extending transversely of the truck with its ends supported from said pads, said pads being of sufficient depth to yield substantially in shear to lateral forces applied in opposite directions transversely of the truck to the upper and lower surfaces respectively of said pads to provide for relative movement of the frame and bolster transversely of the truck, and a shock absorber positioned below the level of the top of the bolster and having parts disposed for normal effective movement relative to each other transversely of the truck, with associated means yieldingly resisting such movement, there being a connection between one of said parts and the bolster and a connection between the other of said parts and the frame, said connections being spaced apart a substantial distance transversely of the truck.

5. In a railway truck, wheel and axle assemblies, a truck frame supported from said assemblies and including side members, with pedestals spacing the assemblies, positioned above the level of the axles, and including a part rigid therewith forming a horizontal seat at a lower level than the axles, a pad of rubber-like material mounted on each of said seats, coil springs seated on the pads, a load-carrying bolster extending transversely of the truck and mounted on said springs, said pads being of sufficient depth to yield substantially in shear to lateral forces applied in opposite directions transversely of the truck to the upper and lower surfaces respectively of said pads to provide for relative movement of the frame and bolster transversely of the truck, and a shock absorber connected directly to the frame and to the bolster and disposed to dampen their relative vertical movement, and a shock absorber positioned below the level of the top of the bolster and having parts disposed for normal effective movement relative to each other transversely of the truck, with associated means yieldingly resisting such movement, there being a connection between one of said parts and the bolster and a connection between the other of said parts and the frame, said connections being spaced apart a substantial distance transversely of the truck.

JAMES C. TRAVILLA, JR.
WILLIAM M. SHEEHAN.

References Cited in the file of this patent

UNITED STATES PATENTS

| Number | Name | Date |
|---|---|---|
| 714,672 | Cliff | Dec. 2, 1902 |
| 779,858 | Lillie | Jan. 10, 1905 |
| 1,911,330 | Symington | May 30, 1933 |
| 1,916,140 | Hedgcock | June 27, 1933 |
| 2,132,001 | Dean | Oct. 4, 1938 |
| 2,168,293 | Kiesel | Aug. 1, 1939 |
| 2,171,069 | Piron | Aug. 29, 1939 |
| 2,180,492 | Wilson et al. | Nov. 21, 1939 |
| 2,244,501 | Pierce | June 3, 1941 |
| 2,284,696 | Travilla et al. | June 2, 1942 |
| 2,321,845 | Nystrom et al. | June 15, 1943 |
| 2,424,625 | Nystrom et al. | July 29, 1947 |
| 2,431,072 | Nystrom et al. | Nov. 18, 1947 |
| 2,469,513 | Nystrom et al. | Nov. 10, 1949 |
| 2,538,380 | Pflager | Jan. 16, 1951 |